United States Patent

Moores et al.

[15] 3,644,127
[45] Feb. 22, 1972

[54] PRODUCTION OF SOLID FLAVORING COMPOSITIONS

[72] Inventors: Ralph G. Moores, Briarcliff Manor; Charles L. Teitelbaum, New York, both of N.Y.

[73] Assignee: General Foods Corporation, White Plains, N.Y.

[22] Filed: Sept. 16, 1969

[21] Appl. No.: 858,506

[52] U.S. Cl. ..................................... 99/140 R, 99/199
[51] Int. Cl. .................................................. A23l 1/26
[58] Field of Search ................................. 99/140, 199

[56] References Cited

UNITED STATES PATENTS

| | | | |
|---|---|---|---|
| 2,728,678 | 12/1955 | Sharp | 99/199 |
| 2,824,807 | 2/1958 | Laster et al. | 99/140 X |
| 2,899,313 | 8/1959 | Makower et al. | 99/140 |
| 2,919,989 | 1/1960 | Schultz | 99/140 |
| 3,023,106 | 6/1962 | Swisher | 99/140 |
| 3,183,099 | 5/1965 | Schultz et al. | 99/140 |
| 3,397,063 | 8/1968 | Carlson et al. | 99/140 X |

*Primary Examiner*—Morris O. Wolk
*Assistant Examiner*—R. E. Serwin
*Attorney*—Bruno P. Struzzi and Thomas V. Sullivan

[57] ABSTRACT

Solid flavoring compositions are produced by heating a sugar-water mixture to caramelization and then combining this mixture with a flavor oil such as a citrus fruit oil. The resultant liquid is then emulsified in a typical flavor fixative and spray dried to form a free flowing powder consisting of spherical particles having an outer surface flavor fixative literally encapsulating the flavor oil component.

9 Claims, No Drawings

PRODUCTION OF SOLID FLAVORING COMPOSITIONS

BACKGROUND OF THE INVENTION

This invention relates to the production of solid flavoring compositions which will not undergo deterioration of taste on contact with air. These flavoring compositions are especially useful in the manufacture of powdered beverage compositions which are adapted to be reconstituted in cold water.

Essential oils extracted from citrus fruits (e.g., by cold pressing citrus rinds) are widely used as flavoring agents. However, these oils possess a marked tendency to deteriorate and develop off-flavors when they are exposed to the atmosphere.

One of the processes heretofore widely used to prevent the oxidation of these citrus oils is to incorporate the oil in a solid emulsion with an amorphous, water soluble, edible matrix material. One of these typical processes is set forth by Swisher in U.S. Pat. Nos. 2,809,895 and 3,041,180. Briefly stated the Swisher process discloses preparing, with the aid of a suitable dispersant, an emulsion of the essential oil in a corn syrup solids solution, having a moisture content of from 3 to 8.5 percent, solidifying the emulsion and converting the solid emulsion to a particulate granular consistency. Preferably, any oil which appears on the surface of the particles is removed by washing the particles with a solvent which will dissolve the essential oil but not the corn syrup solids. The particles are then dried to remove the solvent.

While these prior art solid flavoring compositions are suitable for their intended purpose and have received good commercial acceptance, the cost of these flavoring agents is estimated to be about 10 times the price of the oil itself. Additionally the particles produced by these prior art methods tend to be of an irregular shape which hampers the flowability of the product and which tends to cause segregation of the smaller particles from the larger particles during packaging and shipping of the product. The prior art particles also tend to be somewhat hygroscopic necessitating the use of moistureproof containers (e.g., glass jars) for storing the product.

SUMMARY OF THE INVENTION

In accordance with the present invention a flavoring agent, comprising the product obtained from heating an essential oil (e.g., citrus oils, peppermint oil, etc.) with a caramelized sugar, is dispersed in a typical water-soluble flavor fixative such as natural gums, gelatin, hydrolyzed starch and the like and then spray dried in conventional spray drying equipment to produce a solid flavoring composition in a new and novel manner. The solid composition so produced is preferably in the form of relatively small (5-500 microns) particles, each particle comprising droplets of the flavoring agent encapsulated in the fixative so that less than about 1 percent of the essential oil component of the flavoring agent is present on the surface of the particles.

It is an object of this invention to provide a quick, efficient process for producing a solid essential oil flavoring composition which is at least equivalent to known compositions in stability and taste but which is considerably more economical to produce.

Another object of the present invention is to provide the production of solid flavoring compositions wherein the moisture content of the components does not have to be controlled.

A further object of this invention is to produce a solid flavoring composition having a candylike taste.

Yet another object of this invention is to produce a solid flavoring composition consisting of spherical spray-dried particles which have good flowability and which are readily soluble in cold water.

Additional objects and advantages of the invention will be obvious from the description herein.

DETAILED DESCRIPTION OF THE INVENTION

In general, the process for making the composition of this invention includes heating, to about a temperature of from 245° to 270° F. for 30 to 90 minutes, a sugar or a mixture of sugars such as invert sugar, preferably in the presence of a catalyst (e.g., $K_2HPO_4$, $K_3PO_4$, etc.) to obtain a caramelized sugar syrup having a Klett color standard (color measured on a 5 percent water solution with a Klett Colorimeter using a No. 52 filter) in the range of 36 to 70. An essential oil-water emulsion is then mixed with the cooled caramelized sugar syrup and while the mixture is being agitated it is heated to about 190° to 225° F. At this elevated temperature a type of flavor interaction takes place and, although it is not wished to be limited to such, it is believed that the thermal degradation products of the caramelized sugars chemically interact either directly or indirectly with the essential oil component to yield a flavoring agent having a candylike flavor. The syrup-oil product is then cooled and if necessary this product may be stored in a cooled condition for up to at least 24 hours.

The cooled syrup-oil product is next emulsified in a water solution of the flavor fixative (e.g., gum arabic) and this emulsion which should contain on the order of 30–40 percent solids is fed to a spray drier under conditions appropriate to produce a solid flavoring composition consisting of spherical particles of relatively uniform size, on the order of 5–500 microns and preferably within the range of 5–300 microns. The emulsion can be spray dried using either a bowl- or nozzle-type atomizer. The appropriate conditions (e.g., feed rate, pressure, etc.) for spray drying will depend on many factors such as the particular components of the emulsion, and its physical properties such as temperature, viscosity, and so forth; however, the appropriate operating conditions can be easily ascertained by one skilled in the art through a series of pilot runs.

The monosaccharide sugars are preferred in this invention since they caramelize at a lower temperature than the higher molecular weight di- and polysaccharides; however other sugars such as the disaccharide, sucrose, or mixtures of sugars can readily be used in this invention. The choice of sugars used in this invention is not critical since either a crystalline or amorphous structure in the sugar component of the final product is acceptable. The prior art, as illustrated by U.S. Pat. No. 2,856,291 to Schultz, was limited to the use of sugars which would not crystallize upon cooling thereby enabling the atmosphere to contact the flavoring agent through the interstices in the crystal structure. In the instant invention any crystalline sugar structure which may be present is encapsulated and protected from the atmosphere by the flavor fixative.

The caramelization step which is required for the process of this invention is a complex chemical action in which, under the influence of sufficient heat, the sugars condense and break down while physically undergoing a change in color. The appropriate caramelizing temperature will depend on the particular sugar as well as the rates of heating and cooling; however using the Klett color standard (color measured on a 5 percent water solution with a Klett Colorimeter using a No. 52 filter) as a desired end point those skilled in the art will readily be able to find the operating conditions for producing the proper degree of caramelization.

The preferred sugar for use in this invention is invert sugar (e.g., Regular Nulomoline, a standardized invert sugar in plastic form, free from all traces of oil and grease and containing about 23.5 percent water) which is a mixture of equal parts glucose and fructose and which is readily obtained by the hydrolysis of sucrose. It is desirable to add to the sugar, before heating, a small quantity of a liquid plasticizer (e.g., glycerine, propylene glycol, etc.) to not only ensure the formation of a nonbrittle solid but also to aid in the liquefaction of the sugars during the heating operation. An advantage of this invention is that the moisture content of the sugar does not have to be closely controlled. This improvement is a benefit in the spray drying technique heretofore unused in the production of solid essential oil flavoring compositions.

In forming the essential oil-water emulsion it is desirable to dissolve a commercial emulsifier, such as vegetable gums (e.g., gum arabic), pectin, albedo, mono- and diglycerides, polyoxyethylene esters of long chain fatty acid monoesters of hexitans, etc., in hot (about 155° F.) water and to then cool the solution before emulsifying the oil in the aqueous solution. The oil itself is preferably stabilized with an antioxidant such as butylated hydroxyanisole (BHA) and stored cold until it is used. In order to adjust the taste of the flavoring agent a relatively small amount of an alcohol, such as isopropyl alcohol, may be incorporated in the oil emulsion. When this is desired the alcohol is added to the oil before the oil is emulsified in the aqueous solution.

The solid flavoring compositions of the present invention comprises an emulsion of droplets of a degradable flavoring agent dispersed within a solid matrix phase consisting of an amorphous flavor-fixative material. The flavoring agent, which is the product of the caramelized sugar, essential oil heating operation, is literally encapsulated within the matrix phase in such a manner that, surprisingly, less than 1 percent of the total flavoring agent is present on the surface of the particles. It is believed, but it is not wished to be limited to such, that when the final emulsion is sprayed into a drying tower each liquid particle has a surface which consists predominately of the flavor-fixative water solution and, as the particle assumes, due to surface tension, spherical shape, droplets of the flavoring agent act as a type of nucleus about which the flavor-fixative solution forms a spherical shell. Upon passage through the drying tower the water from the fixative solution is removed to produce a relatively impermeable coating of the fixative as the surface of each particle.

DESCRIPTION OF THE PREFERRED EMBODIMENTS

The invention is further demonstrated by the following examples:

EXAMPLE I

| Mixture A | lbs. |
|---|---|
| Invert Sugar (Nulomoline) | 8.3 |
| K₂HPO₄ (5% solution) | 0.2 |
| Glycerine | 0.4 |
| | |
| Mixture B | |
| Gum Arabic | 5.1 |
| Water | 11.9 |
| Orange Oil | 6.1 |
| Isopropyl Alcohol | 0.25 |
| | |
| Mixture C | |
| Gum Arabic | 43.6 |
| Water | 82.2 |

Mixture A, while being continuously stirred, is heated from ambient to 255° F. over a period of 1 hour and then is cooled to 115° F. in 20 minutes to produce a caramelized syrup having a Klett color standard of 51. Mixture B is formed by adding the isopropyl alcohol to the orange oil (single fold California orange oil with 0.2 percent BHA added) and then this mixture is blended with the gum arabic-water solution. Mixture B is then added to mixture A and then this total mixture, while maintaining continuous stirring, is heated from 100° to 200° F. in about 10 minutes and cooled to 115° F. in 15 minutes. This resultant product mixture is blended with mixture C to produce an emulsion having about 40 percent solids. The emulsion then is fed to a spray drier having a 9-inch bowl atomizer rotating at 1,200 r.p.m. and operating with an inlet temperature of 360° F., an outlet temperature of 180° F., a feed temperature of 90° F., and a homogenization pressure of 1,000 p.s.i.g.

EXAMPLE II

| Mixture A | lbs. |
|---|---|
| Invert Sugar (Nulomoline) | 147.1 |
| K₂HPO₄ (5% solution) | 3.5 |
| Glycerine | 7.1 |
| | |
| Mixture B | |
| Gum Arabic | 86.0 |
| Water | 201.2 |
| Lemon Oil | 103.2 |
| Isopropyl Alcohol | 4.2 |
| | |
| Mixture C | lbs. |
| Gum Arabic | 702.0 |
| Water | 2157.0 |

Mixture A is heated between 250° F. and 260° F. with a heating time of 40–50 minutes and then cooled to 140° F. within 45 minutes. To 121.6 lbs. of this caramelized mixture (Klett color standard of 51) mixture B, formed in the manner described in Example I, is added. This total mixture, while continuous stirring is maintained, is heated to 200° F. in 15–25 minutes in order to promote the desired interaction and then cooled to 130°–140° F. in 20–30 minutes. Then 490 lb. of the resultant product is blended and emulsified with mixture C to produce an emulsion containing 30 percent solids. The emulsion is next spray dried in a drier having two 48/27 nozzle atomizers, a capacity of 400 lb./hr., an inlet temperature of 370° F., an outlet temperature of 205° F., a nozzle feed temperature of 126° F., a nozzle pressure of 1,000 p.s.i.g., and a homogenization pressure of 1,000 p.s.i.g. Upon analysis only 0.8 percent of the essential oil flavoring agent is found on the particle surfaces.

The solid flavoring compositions produced by this invention consists of spherical particles (5–500 microns in diameter) which are relatively nonhygroscopic and which contain less than about 8 percent by weight of moisture. These particles can be stored for an exceptionally long period (a year or more) without undergoing any deterioration in taste. Due to the nonhygroscopic nature of these particles storage and packaging of the particles may take place in such air-permeable containers as paper envelopes. These flavoring compositions, due to their uniform shape and size have good flowability, especially when a small amount (1.5 percent by weight) of tricalcium phosphate is added to the final product, and due to the large total surface area the composition is readily dissolved in liquids such as cold water.

Various modifications are contemplated and may obviously be resorted to by those skilled in the art without departing from the spirit and scope of the disclosed invention.

Having thus described the invention what is claimed is:
1. A process for producing a solid flavoring composition in the form of spherical particles comprising the steps of: heating at least one sugar to produce a caramelized sugar syrup, mixing the caramelized syrup together with an essential oil, heating the mixture to produce a flavor interaction between the caramelized syrup and the oil, blending the resultant mixture with an aqueous flavor-fixative solution to form an emulsion, and spray drying the emulsion to produce spherical particles having a diameter within the range of 5–500 microns.

2. The process as set forth in claim 1 wherein the caramelized sugar has a Klett color standard (color water solution with a Klett Colorimeter using a No. 52 Filter) of from 36 to 70.

3. The process as set forth in claim 1 wherein the sugar consists of monosaccharide sugars.

4. The process of claim 1 wherein the sugar is invert sugar.

5. A process for producing a solid flavoring composition in the form of spherical particles comprising the steps of: heating invert sugar in a temperature range of from 245° F. to 270° F. for a period of from 30 to 90 minutes to produce a caramelized sugar syrup, mixing the caramelized syrup together with a citrus oil, heating the mixture to a temperature of from 190° to 225° F. to produce a flavor interaction between the caramelized syrup and the oil, blending the resultant mixture with an aqueous flavor-fixative solution to form an emulsion, and spray drying the emulsion to form spherical particles having a diameter within the range of 5–500 microns.

6. The process of claim 5 wherein the particle diameter range is from 5-300 microns.

7. The process of claim 6 wherein the citrus oil is orange oil.

8. The process of claim 7 wherein the flavor fixative is gum arabic.

9. The process of claim 5 wherein the flavor fixative is gum arabic.

* * * * *